Nov. 17, 1936.　　　E. W. DAVIS ET AL　　　2,061,062
LUBRICATING APPARATUS
Filed Jan. 28, 1935
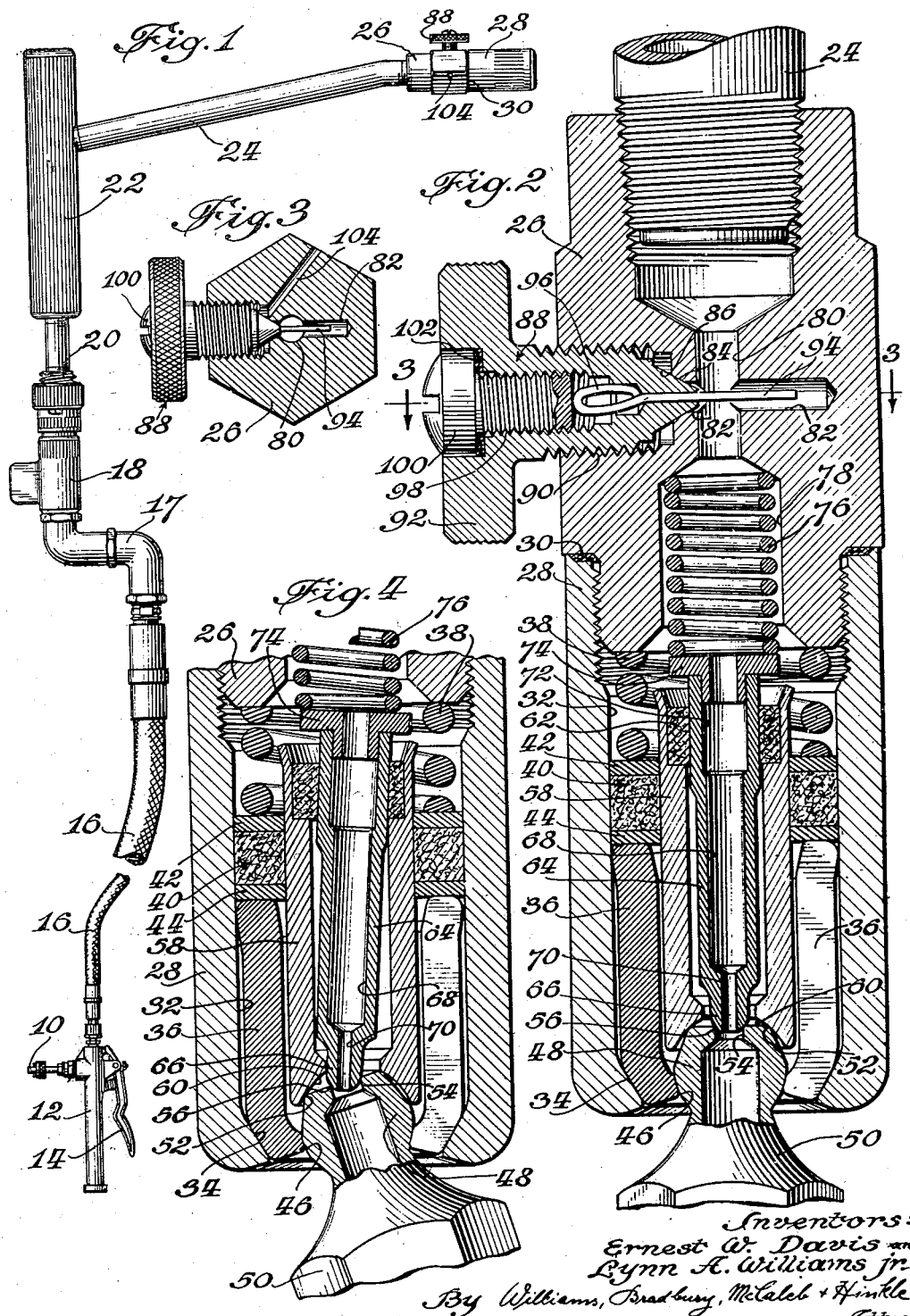
Inventors:
Ernest W. Davis and
Lynn A. Williams Jr.
By Williams, Bradbury, McCaleb & Hinkle
Attys.

Patented Nov. 17, 1936

2,061,062

UNITED STATES PATENT OFFICE 2,061,062

LUBRICATING APPARATUS

Ernest W. Davis, Oak Park, and Lynn A. Williams, Jr., Winnetka, Ill., assignors to Stewart-Warner Corporation, Chicago, Ill., a corporation of Virginia Application January 28, 1935, Serial No. 3,712

4 Claims. (Cl. 285—169)

Our invention relates generally to high pressure lubricating apparatus, and more particularly to couplers for making detachable connections with lubricant receiving fittings forming parts of such systems.

In one form of high pressure lubricating system now in general use, the lubricant receiving fittings are formed with an enlarged head and the lubricant compressor is provided with a coupler having jaws which are lubricant pressed to engage the head of the fitting and in which a lubricant pressed plunger is slidable within the jaws and adapted to contact with the end of the fitting to form the lubricant-tight connection. A coupler of this type is disclosed in the copending application of Joseph Bystricky, Serial No. 707,687, filed January 22, 1934.

Our present invention constitutes an improvement of the coupler disclosed in said application in that a double seal is effected between the coupler and the fitting, both being metal-to-metal seals and both permitting considerable angular displacement between the axes of the coupler and fitting.

It is thus an object of our invention to provide an improved coupler for high pressure lubricating systems for making connections with lubricant receiving fittings by a plurality of metal-to-metal seals, and in which considerable universal movement between the coupler and fitting is possible.

A further object is to provide an improved vent valve for lubricant pressure actuated couplers.

Other objects will appear from the following description, reference being had to the accompanying drawing, in which Fig. 1 is an elevation of the discharge conduit of a high pressure lubricant compressor, terminating in our improved coupler;

Fig. 2 is a central longitudinal sectional view of our improved coupler shown connected to the head of a lubricant receiving fitting;

Fig. 3 is a transverse sectional view taken on the line 3—3 of Fig. 2; and

Fig. 4 is a fragmentary sectional view showing the coupler connected to a lubricant receiving fitting with the axes of these parts at an angle to one another.

The coupler of our invention is adapted for use with any one of a number of different types of high pressure lubricant compressors, either power or manually operated, and is herein shown as it is used with a power operated compressor. The lubricant compressor itself is not illustrated, but is adapted to have its discharge conduit connected to an inlet fitting 10 forming part of a flow control valve 12. Operation of the handle 14 of the valve 12 permits flow of lubricant from the lubricant compressor to the hose 16 and thence through a swivel connection 17 to a coupler 18.

The coupler 18 is of the type adapted to make a sealed connection with so-called "pin fittings" and is here shown as being connected to fitting 20 of this type which forms part of an adapter having a handle 22 and a pipe extension 24. The coupler of our invention is secured to the end of the pipe extension 24. The coupler comprises a pressure relief valve body 26, one end of which is threaded to the pipe extension 24 and has a casing 28 threaded to its other end, a suitable gasket 30 being provided to seal the latter connection. The casing 28 has a cylindrical bore 32 which terminates in an inwardly tapering cam surface 34 which cooperates with a plurality, usually three, jaws 36. The jaws are pressed outwardly by a compression coil spring 38 which acts upon an annular piston 40, the piston being confined between a pair of washers 42, 44, the latter washer pressing against the inner ends of the jaws 36.

The jaws 36 are suitably conformed to engage the spherical surface 46 formed on the head 48 of a lubricant receiving fitting 50. The fitting 50 is provided with a flat tip surrounded by a circular relatively sharp dirt-cutting edge 52 and provided with an inlet opening 54 defined by a relatively sharp edge 56. A nozzle 58 is longitudinally slidable in the annular piston 40 and at its outer end has a concave spherical contact surface 60 for universal contact with the dirt-cutting edge 52 of the fitting. The inner end of the nozzle 58 is recessed to receive a packing 62 forming flexible sealing means for a high pressure sealing member 64. The member 64 terminates in a tip 66 of generally hemispherical contour and of sufficiently small size to penetrate the inlet opening 54 of the fitting and to engage the edge 56 surrounding this opening. The member 64 is provided with a longitudinal lubricant conducting passageway 68 which terminates in a small drilled passageway 70 which intersects the hemispherical surface of the tip 66. The inner end 72 of the member 64 is of slightly enlarged diameter and is longitudinally slidable in the packing 62. This packing is sufficiently elastic that the member 64 may be moved angularly as indicated in Fig. 4.

A flanged apertured bushing 74 is pressed into the inner end of the member 64 and forms a seat for the compression coil spring 76. The spring 76 lies mainly within a bore 78 formed in the relief valve body 26.

The body 26 has a passageway 80 connecting the pipe 24 with the bore 78, this passageway being intersected by a transversely drilled hole 82. A needle valve seat 84 is formed at the end of the drilled hole 82 for cooperation with the conical surface 86 of a relief valve 88 which is screwed into a threaded bore 90 and has a knurled head 92. A wire 94 extends from the end of the valve 88, being secured therein by a loop portion 96 of the wire positioned within a threaded bore 98 formed in the valve 88. The bore 98 is closed by a cap screw 100 which forms a plug for the opening and also engages the loop portion 96 to hold the wire in place. A suitable gasket 102 is provided to prevent leakage of lubricant around the head of the screw 100.

The wire 94 is of tough, hardened steel and is of sufficiently small diameter that it may be used to clean the passageway 70 in the high pressure sealing member 64. The latter passageway is of such small diameter that it may occasionally become clogged by particles of foreign material contained in the lubricant. The wire 94 is thus always at hand in case such accidental clogging of the passageway 70 requires its use. A vent passageway 104 connects the threaded bore 90 with the atmosphere.

In normal use the coupler is pressed against a fitting to be supplied with lubricant, this pressure forcing the jaws 36 and piston 40 inwardly against the pressure of the spring 38 a sufficient distance to permit the jaws to clear the portion of the head 48 of the fitting of greatest diameter, whereupon the spring 38 will force the jaws outwardly into engagement beneath the head of the fitting as shown in Fig. 2.

Upon application of lubricant pressure, as by opening the flow control valve 12, the force of the spring 38 will be supplemented by the lubricant pressure acting upon the piston 40 to force the jaws more firmly into contact with the fitting, absolutely precluding its removal from the coupler. The lubricant pressure acting upon the exposed inner end of the nozzle 58 will force the latter outwardly to cause the concave spherical contact surface 60 thereof to form a lubricant-tight contact seal with the dirt-cutting edge 52 of the fitting. Similarly the lubricant pressure acting upon the exposed inner end of the high pressure sealing member 64 will supplement the force of the spring 76 and cause the hemispherical contact tip thereof more tightly to engage and seal against the edge 56 of the fitting.

Inasmuch as it is somewhat difficult for the operator to place the coupler in axial alignment with the fitting, or to maintain it in such alignment, the high pressure sealing member 64 is made capable of slight tilting or rocking movement as indicated in Fig. 4. It will be observed from Fig. 4 that the contour of the hemispherical tip 66 of the member 64 is such that the seal is maintained even though the angle between the axes of the coupler and fitting is relatively great. The surfaces of the jaws 36 which engage the fitting are likewise conformed to permit considerable angular movement. By constructing the coupler of our invention in this manner we have substantially eliminated the possibility of breakage of the hemispherical tip 66 due to movement of the coupler out of alignment with the fitting.

If the bearing being supplied with lubricant is obstructed in any way and the pressure in the coupler therefore does not drop when the control valve 12 is closed after sufficient lubricant has been supplied to the bearing, the valve 88 may be opened to relieve the lubricant pressure in the coupler. A small amount of lubricant may then flow from the coupler to the atmosphere through the vent passageway 104, thus reducing the pressure within the coupler to that of the atmosphere. When the pressure within the coupler has been thus or otherwise relieved, the coupler may be disconnected from the fitting by tilting it slightly beyond the position in which it is shown in Figure 4, and pulling it from the fitting.

It will be noted that the spherical surface is the only portion of the tip 66 which bears against the fitting so that as the coupler is tilted relative to the fitting to a greater extent than shown in Figure 4, the sealing member 64 is cammed upwardly. Thus damage to the spherical surface of the tip 66 or breakage of the tip is avoided. The size of the opening in the nozzle 58 through which the tip projects, and the radii of curvature of surface 60 and of the spherical surface of the tip 66, are so correlated with dimensions of the head of the fitting that the two contact seals are broken substantially simultaneously as the coupler is disengaged from the fitting.

Having thus described a preferred embodiment of our invention, it is to be understood that many modifications may be made without departing from the spirit of the invention, and we do not wish to be limited to the precise details set forth but desire to avail ourselves of all changes within the scope of the appended claims.

We claim:

1. A coupler for high pressure lubricating systems employing lubricant-receiving fittings, comprising a casing, a plurality of jaws mounted for sliding movement in said casing and having end portions for engagement with a lubricant-receiving fitting, a nozzle part located within said jaws and having at one end a concave spherical end surface for engagement with the peripheral edge of the tip end surface of the fitting, and having its other end exposed to the pressure of the lubricant within said casing, said nozzle part having a bore extending therethrough and terminating in said concave contact surface, a spring and lubricant-pressed high-pressure contact member mounted partially within the bore of said nozzle part and movable longitudinally and laterally with respect to said part, said member having a convex tip projecting through the outer end of said nozzle part and capable of making contact with the edge of said fitting surrounding its inlet opening to make a lubricant-tight sealed connection with the fitting, said outer end of said nozzle part being of sufficiently small diameter to permit substantial lateral movement in said nozzle bore adjacent said contact surface, and means forming a flexible seal between said nozzle part and said contact member.

2. A coupler for high-pressure lubricating systems employing lubricant-receiving fittings, each having an end face of small diameter surrounded by a dirt-cutting edge and provided with an inlet opening, comprising a casing, means within the casing for mechanically attaching the coupler to a lubricant-receiving fitting, a nozzle slidable within said casing and having an apertured concave seating surface cooperable with the dirt-cutting edge of the fitting, an annular packing carried by said nozzle, and a high-pressure sealing element longitudinally slidable and tiltable in said packing, said element having a sealing tip extending through the aperture in the seating surface of said nozzle, said tip being of sufficiently small diameter to permit substantial lateral movement thereof in said aperture, and being engageable with the edge of the fitting surrounding its inlet opening to form a lubricant-tight seal therewith.

3. A coupler for high pressure lubricating systems employing lubricant-receiving fittings, each having an end face of small diameter surrounded by a dirt-cutting edge and provided with an inlet opening, comprising a casing, means within the casing for mechanically attaching the coupler to a lubricant-receiving fitting, a nozzle slidable within said casing and having an apertured concave seating surface cooperable with the dirt-cutting edge of the fitting, an annular packing carried by said nozzle, and a high-pressure sealing element longitudinally slidable and tiltable in said packing, said element having a spherically convex sealing tip extending through the aperture in the seating surface of said nozzle, said tip being of sufficiently small diameter to permit substantial lateral movement thereof in said aperture, and being engageable with the edge of the fitting surrounding its inlet opening to form a lubricant-tight seal therewith.

4. A coupler for high pressure lubricating systems comprising lubricant-pressure operated means for locking the coupler to a lubricant-receiving fitting, a high-pressure sealing member having a discharge port of small diameter, a manually operable valve for relieving lubricant pressure within the coupler, said valve being bodily removable from the coupler, and a wire secured to said valve and of sufficiently small diameter to be usable to remove obstructions from the discharge port of said sealing member.

ERNEST W. DAVIS.
LYNN A. WILLIAMS, Jr.